Figure 1:
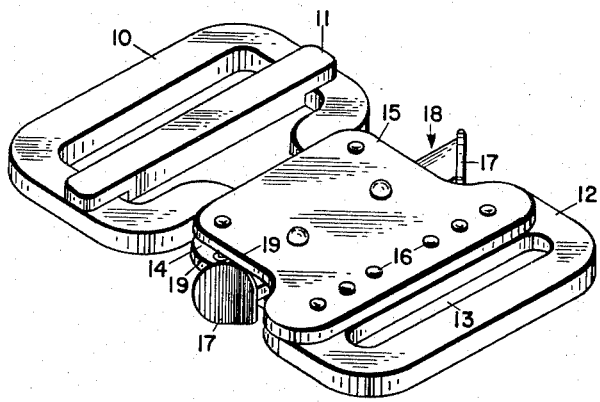

Aug. 19, 1958  F. A. ROBINTON  2,847,748
QUICK ATTACH AND RELEASE DEVICE
Filed April 28, 1953

INVENTOR.
FRANK A. ROBINTON
ATTORNEYS

United States Patent Office 2,847,748
Patented Aug. 19, 1958

2,847,748
QUICK ATTACH AND RELEASE DEVICE
Frank A. Robinton, El Centro, Calif.
Application April 28, 1953, Serial No. 351,760
2 Claims. (Cl. 24—211)
(Granted under Title 35, U. S. Code (1952), sec. 266)

The invention described herein may be manufactured and used by or for the Government of the United States of America for governmental purposes without the payment of any royalties thereon or therefor.

The present invention relates to a quick attach and release device employing a lever arrangement which provides a positive self-locking action when the device is in operative position and yet which may be quickly and easily manually released.

The present invention may be utilized in any application where it is desired to lock two or more members together. However, the invention device is particularly adapted for use with parachute harnesses wherein it may be employed for connecting and releasing the straps of the harness. In such cases, the device must be so constructed as to prevent accidental and premature unlocking of the device before or during a parachute descent, yet provide a means whereby the device may be quickly and easily released by the wearer so that he may free himself from the harness and parachute upon landing.

To insure maximum safety and prevent accidental release of the harness, prior art devices have employed complicated locking means which require two different and successive operations to release the harness. Such devices are of expensive construction and because of the various movements required to unlock them, they often require the use of two hands and are difficult to operate. This is disadvantageous since the manual dexterity of the parachute wearer is often limited upon landing, and it is essential that the releasing operation be as simple and rapid as possible. Prior art devices are also bulky and uncomfortable to the wearer, sometimes causing him injury during the parachute descent due to projections and irregular surfaces formed on the device.

The present invention utilizes a lever arrangement which is so constructed that when the device is in operative position, a load tending to separate the components of the device produces a self-locking action thereby positively preventing release thereof. The invention device may be quickly and easily unlocked by a simple squeezing action of one hand, yet accidental release by any other type of movement or actuation is prevented. The device is flat in configuration and is lighter, less bulky, and more comfortable to the wearer than prior art devices.

An object of the present invention is the provision of a new and novel quick attach and release device which may be quickly and easily actuated into locked and unlocked position using only one hand.

Another object is to provide a quick attach and release device which provides a self-locking action when under load.

A further object of the invention is the provision of a quick attach and release device which prevents accidental unlocking of the device.

Still another object is to provide a quick attach and release device which is light in weight and comfortable to the wearer.

Yet another object of the present invention is the provision of a quick attach and release device which is simple and inexpensive in construction, yet sturdy and positive in operation.

Figure 2:
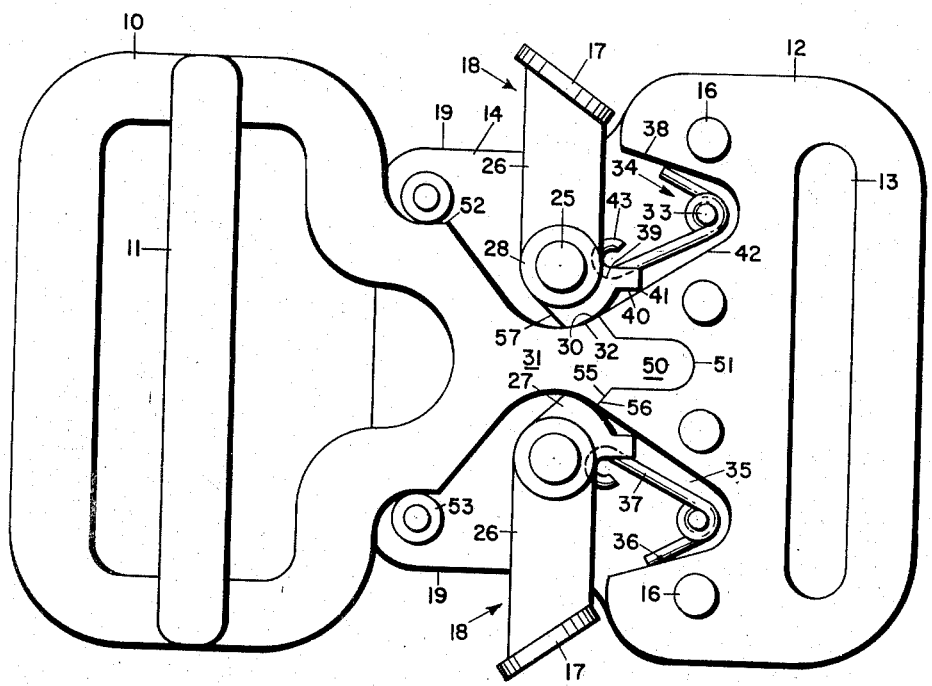

Other objects and many of the attendant advantages of this invention will be readily appreciated as the same becomes better understood by reference to the following detailed description when considered in connection with the accompanying drawings wherein:

Fig. 1 shows an isometric view of a preferred embodiment of the invention device in operative locked position, and Fig. 2 illustrates a cutaway plan view of the device shown in Fig. 1.

Referring now to the drawing wherein like reference characters designate like or corresponding parts throughout the several views, there is shown in Fig. 1 a substantially flat male connecting member 10 having a conventional friction adapter 11 slidably mounted thereon for attaching a parachute harness or the like to member 10. A substantially flat female connecting member 12 is provided with a slot 13 whereby a parachute harness or the like may be suitably attached thereto, and has keeper plates 14 and 15 secured in spaced relation to opposite faces thereof by a plurality of rivets 16 to receive the male member therebetween. Locking members 18 are provided with manually engageable end portions 17 which extend beyond the lateral portions 19 of the keeper plates, said locking members and male connecting member lying substantially in a common plane.

Fig. 2 shows a plan view of the device shown in Fig. 1 with keeper plate 15 removed, and it should be noted that keeper plate 14 may be a separate member as shown or may be formed integral with member 12. Two pivot pins 25 are rigidly mounted in member 14, and locking members 18 are pivotably or rotably mounted at an intermediate point thereof on these pins.

The locking members consist of a relatively long arm 26 having a bearing portion 28 formed thereon and a relatively short arm 27, the long arm being provided with manually engageable end portions 17 and the short arm being provided with curved or arcuately shaped locking surfaces 30 formed as cam surfaces on the outer periphery thereof. An end portion 31 of member 10 has complementary arcuately shaped locking surfaces 32 formed on the outer periphery thereof, and it is apparent that when the device is in operative locked position as shown, surfaces 30 and 32 are in abutting frictional engagement.

Two pins 33 are rigidly mounted in member 14, and curved springs 34 are pivotally mounted thereon, the springs being disposed within suitable recesses 35 formed in member 12 and having two resilient arms 36 and 37 formed integral therewith. The end portions of arms 36 abut walls 38 of recesses 35, and the end portions 43 of arms 37 are disposed within correspondingly shaped grooves 39 formed in adjacent lateral surfaces of members 26 and 27 whereby the locking members are normally urged into locked position as shown. It is evident that grooves 39 prevent arms 37 of the springs from becoming displaced relative to arms 26 and 27 of the locking members. Shoulders 40 are formed on arms 27 and the end portions 41 thereof are adapted to engage walls 42 of recesses 35 thereby limiting rotation of the locking members in the locking direction.

As may be clearly seen in Fig. 2, the locking surfaces 30 and 32 have a center of curvature located substantially at the pivot 25 of each locking member respectively, so that when the device is in locked position as shown, any load tending to separate members 10 and 12 causes the surfaces to coact in such a manner that the locking members are pivoted toward locked position thereby producing a self-locking action which positively prevents release of the device. Although surfaces 30 and 32 have been shown as being substantially arcuate in shape, other configurations may be used provided the resultant force applied to the locking members when the device is under load tends to rotate them into locked position.

Arms 26 of the locking members are substantially longer than arms 27 thereof in order to provide sufficient leverage such that the locking members may be easily moved to unlocked position under maximum load conditions.

End portion 31 of member 10 has a pilot or guide extension 50 formed thereon and this extension fits tightly within a correspondingly shaped recess 51 formed in member 12. Member 10 also has shoulders or guide portions 52 formed on opposite sides thereof adapted to engage the outer peripheries of two pins 53 which are rigidly secured to member 14. Guide portions 50, 52 and the cooperating parts 51, 53 respectively prevent lateral displacement of member 10 when in operative position thereby insuring that should one of the locking members be accidentally rotated into unlocked position, member 10 will not become cocked or tilted with respect to member 12 and prevent the displaced locking member from being automatically returned to locked position by the associated spring means. In this manner, accidental jamming of the locking members in unlocked position is prevented.

End portion 31 has shoulders 55 formed thereon which are adapted to engage shoulders 56 formed on member 12 whereby the axial movement of members 10 and 12 toward one another is limited and surfaces 32 are disposed in proper operative position when members 10 and 12 are urged into locked position.

Members 10 and 12 may be urged into locking engagement by simply forcing them toward each other whereupon shoulders 55 engage surfaces 57 formed on arms 27 thereby pivoting the locking members into unlocked position. Guide portion 50 is then inserted in recess 51 until shoulders 55 abut shoulders 56, and the locking members are then automatically pivoted back into locked position by springs 34. The device will be maintained in locked position by springs 34, and as pointed out previously, any load on the device will cause a self-locking action which positively prevents the device from unlocking.

When it is desired to unlock the device, end portions 17 may be manually grasped in one hand of the wearer, and a simple squeezing will simultaneously rotate the locking members into unlocked position whereupon members 10 and 12 can be easily separated. It should be noted that both locking members must be simultaneously moved to unlocked position in order to release the device, and should one of the locking members be accidentally rotated into unlocked position, members 10 and 12 will remain in locked relationship and the displaced locking member will subsequently be automatically returned to locked position by the associated spring means. Therefore, even though the device may be quickly and easily unlocked by a simple squeezing action, accidental release or unlocking by any other type of movement or action is prevented.

From the foregoing it is apparent that there is provided a new and novel quick attach and release device which provides a self-locking action when under load and prevents accidental unlocking of the device, yet which may be quickly and easily actuated into locked and unlocked position using only one hand. The device is light in weight, comfortable to the wearer, and is simple and inexpensive in construction, yet sturdy and positive in operation.

Obviously many modifications and variations of the present invention are possible in the light of the above teachings. It is therefore to be understood that within the scope of the appended claims the invention may be practiced otherwise than as specifically described.

I claim:

1. A quick disconnect for releasing parachute harness straps normally under tension which comprises a first substantially flat elongate connecting member having a strap attaching portion and a longitudinally extending male portion terminating in a free end, said male portion having a first pair of arcuate cam surfaces, each surface being formed on opposite longitudinal edges of the male portion respectively, a second elongate counterpart connecting member having a strap attaching portion and a pair of opposite disposed intermediately pivotal locking levers transversely spaced apart to receive the cam surfaces on the male portion therebetween, said levers having transversely extending arms formed with a second pair of arcuate surfaces, each surface adapted to engage a corresponding cam surface on the male portion in complementary locking relation, spring means for normally urging said arms to a locking position, each of said arcuate surfaces having a center of curvature located substantially at the pivotal axis of the respective locking levers, means for limiting the pivotal movement of said first arms in a direction to wedge said surfaces in self-locking engagement when the connecting members are under tension, said arms being pivotal in an opposite unlocking direction longitudinally toward the free end of the male portion to cam apart said surfaces while under frictional engagement, said levers having a second pair of arms extending respectively transversely beyond opposite longitudinal edges of the members and terminate in finger-engaging portions for grasping by a hand of the user for manually disconnecting said members, said levers and male connecting portion lying substantially in a common plane.

2. The disconnect of claim 1 wherein said first pair of arcuate cam surfaces is concave, and the limiting means is formed integral with the second pair of arcuate cam surfaces.

References Cited in the file of this patent

UNITED STATES PATENTS

| 1,459,673 | Jabner | June 19, 1923 |
| 2,153,077 | Clarke | Apr. 4, 1939 |

FOREIGN PATENTS

| 18,046 | Great Britain | July 30, 1914 |
| 260,448 | Italy | Sept. 19, 1928 |
| 326,459 | Italy | May 23, 1935 |
| 335,175 | France | Jan. 13, 1904 |
| 831,311 | France | June 7, 1938 |